United States Patent
Olnowich

(10) Patent No.: US 6,389,476 B1
(45) Date of Patent: May 14, 2002

(54) NETWORKS ADAPTERS FOR MULTI-SPEED TRANSMISSIONS

(75) Inventor: Howard Thomas Olnowich, Broome County, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/347,991

(22) Filed: Jul. 6, 1999

Related U.S. Application Data

(62) Division of application No. 08/763,468, filed on Dec. 10, 1996, now Pat. No. 6,047,113.

(51) Int. Cl.$^7$ ............................................. G06F 15/16
(52) U.S. Cl. ...................... 709/233; 370/468; 370/391; 370/236
(58) Field of Search ............................... 709/233, 228, 709/232; 370/437, 391, 235, 392, 236, 468

(56) References Cited

U.S. PATENT DOCUMENTS

| | | | | |
|---|---|---|---|---|
| 4,301,532 A | | 11/1981 | Janetzky | 370/85 |
| 4,837,779 A | * | 6/1989 | Lundgren | 375/224 |
| 4,853,841 A | | 8/1989 | Richter | 364/200 |
| 4,931,924 A | * | 6/1990 | Kageura | 709/400 |
| 4,956,851 A | | 9/1990 | Wolensky et al. | 375/8 |
| 5,077,732 A | * | 12/1991 | Fischer et al. | 370/437 |
| 5,153,884 A | | 10/1992 | Lucak et al. | 371/32 |
| 5,177,738 A | | 1/1993 | Delloro et al. | |
| 5,263,172 A | * | 11/1993 | Olnowich | 710/307 |
| 5,345,229 A | * | 9/1994 | Olnowich et al. | 370/360 |
| 5,371,766 A | | 12/1994 | Gersbach et al. | 375/119 |
| 5,408,609 A | * | 4/1995 | Malgogne et al. | 709/228 |
| 5,408,613 A | * | 4/1995 | Okabayashi | 709/234 |
| 5,442,750 A | * | 8/1995 | Harriman, Jr. et al. | 709/233 |
| 5,465,333 A | * | 11/1995 | Olnowich | 710/300 |
| 5,469,502 A | * | 11/1995 | Matsumoto | 379/230 |
| 5,483,525 A | * | 1/1996 | Song et al. | 370/392 |
| 5,559,967 A | * | 9/1996 | Oprescu et al. | 710/105 |
| 5,734,825 A | * | 3/1998 | Lauck et al. | 709/233 |
| 5,740,171 A | * | 4/1998 | Mazzola et al. | 370/392 |
| 5,819,048 A | * | 10/1998 | Okazaki et al. | 709/233 |
| 5,822,522 A | * | 10/1998 | Kazama | 709/233 |
| 5,872,775 A | * | 2/1999 | Saints et al. | 370/342 |
| 5,881,240 A | * | 3/1999 | Asano | 709/233 |
| 5,889,761 A | * | 3/1999 | Yamato | 370/231 |
| 5,898,669 A | * | 4/1999 | Shimony et al. | 370/232 |
| 6,026,096 A | * | 2/2000 | Ferguson et al. | 370/452 |
| 6,125,111 A | * | 9/2000 | Snow et al. | 370/360 |

FOREIGN PATENT DOCUMENTS

| | | | |
|---|---|---|---|
| EP | 137-926 A | 9/1983 | |
| EP | 137928 | 7/1984 | |
| JP | 57-18143 | 1/1982 | H04J/3/06 |
| JP | 5-136758 | 11/1991 | H04J/3/22 |

OTHER PUBLICATIONS

Jolitz, High–Speed Networking, Aug. 1992, Dr. Dobbs Journal, Issue Aug. (1992), pp. 1–10.*

* cited by examiner

Primary Examiner—Glenton B. Burgess
Assistant Examiner—Bradley Edelman
(74) Attorney, Agent, or Firm—Shelley M Beckstrand

(57) ABSTRACT

A network adapter capable of adapting its transmission speed to that of another adapter of the same or slower speed so as to mix adapters of different speeds in the same communication network. In send mode, the adapter selects one of a plurality of transmission speeds based on the message header including a field specifying the message speed, which speed is known to be supported by the adapter at the addressed receive node. The sending adapter prefixes the message with a synchronization byte which defines transmission speed selected and transmits the message at the selected speed. In receive mode, the adapter decodes within one clock cycle the message speed from the message synchronization byte, and responsive thereto generates the clock for gating the receive message into adapter memory.

11 Claims, 10 Drawing Sheets

BIT 31, 30 – SPEED CONTROL BITS (OPTIONAL) 00 = 8 MHZ SPEED, 01 = 25 MHZ SPEED
10 = 50 MHZ SPEED, 11 = 75 MHZ SPEED

BIT 29 TO 16 – DESTINATION ADDRESS OVER THE NETWORK
BIT 15 TO 0 – WORD COUNT OF MESSAGE NOT INCLUDING MESSAGE HEADER
(MESSAGE MUST BEGIN AND END ON 32-BIT WORD BOUNDARIES)

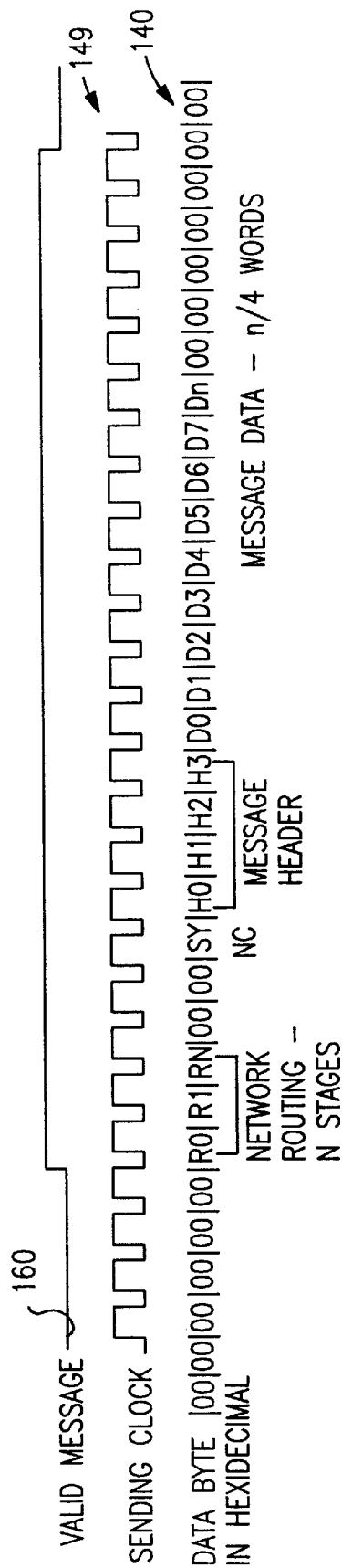

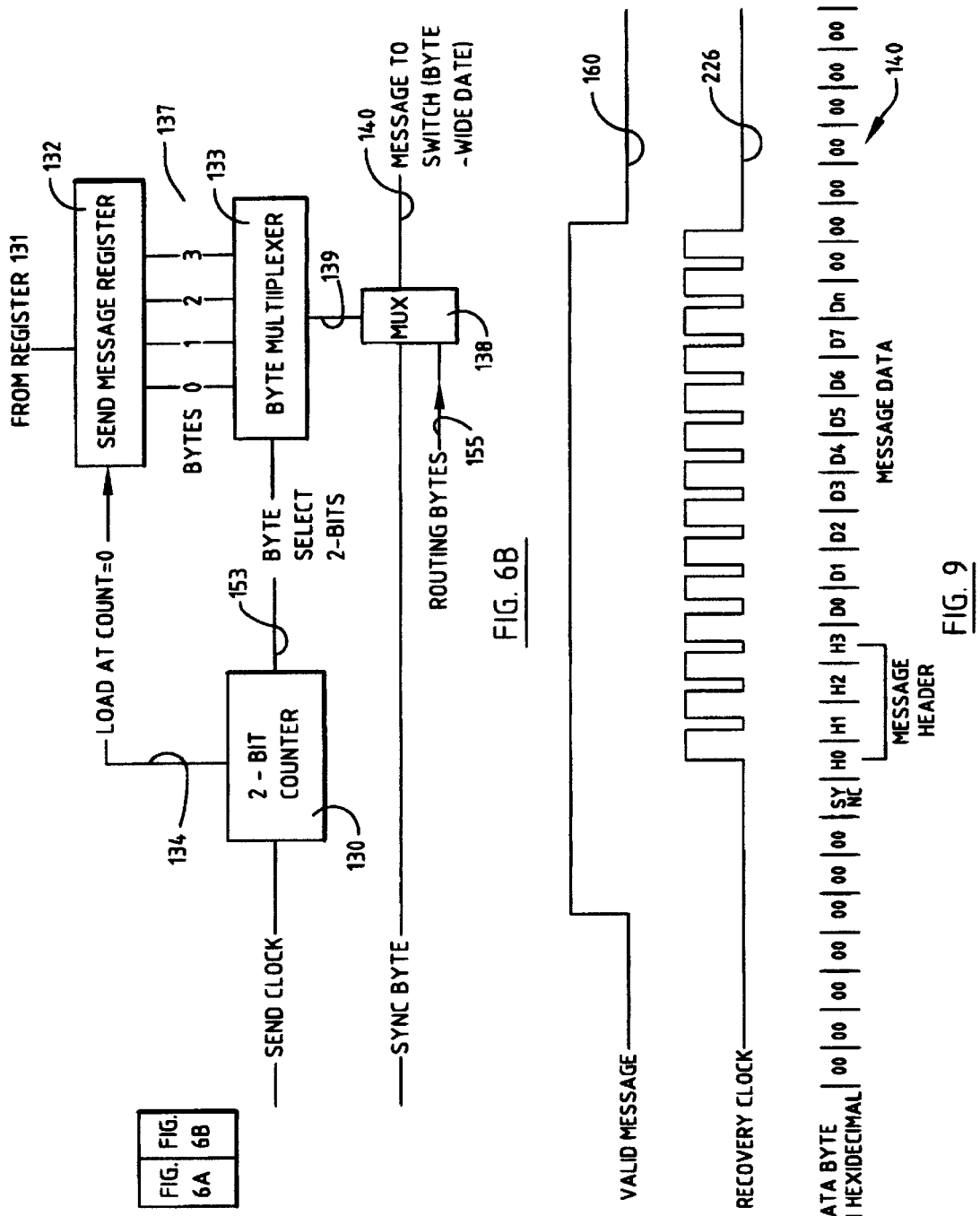

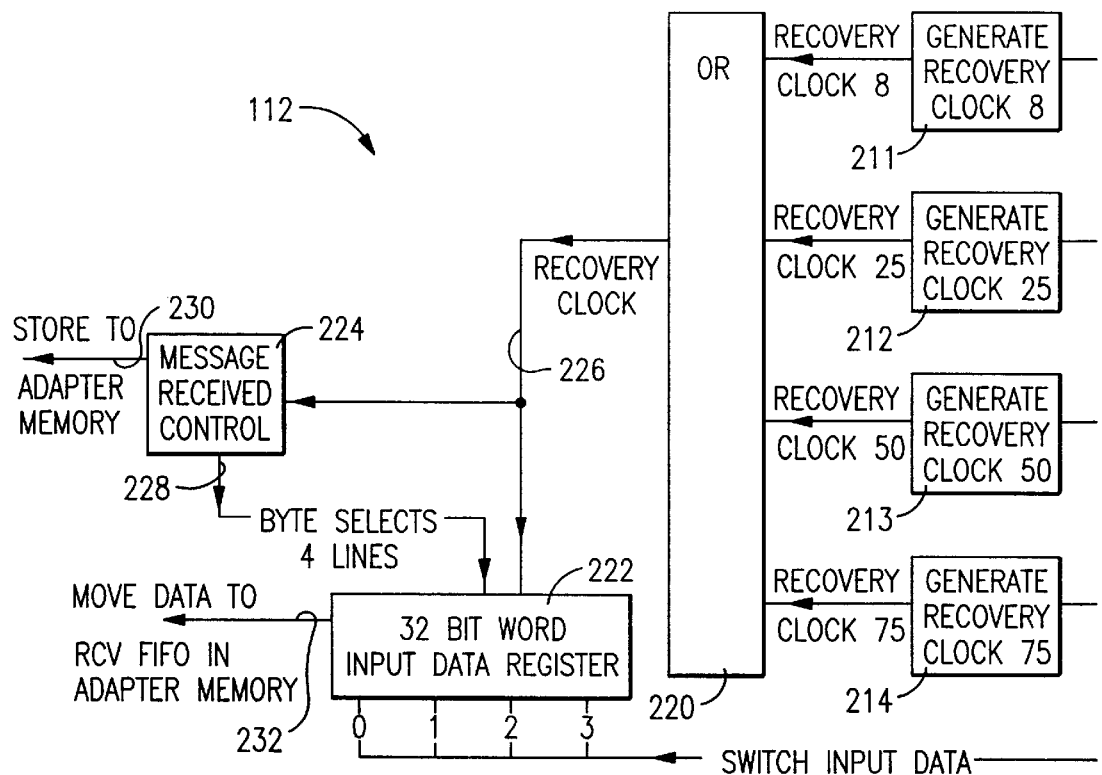
FIG.8A
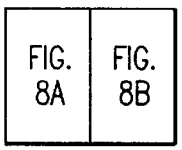

NETWORKS ADAPTERS FOR MULTI-SPEED TRANSMISSIONS

CROSS REFERENCE

This application is a divisional of Ser. No. 08/763,468, filed Dec. 10, 1996 for NETWORK ADAPTERS FOR MULTI-SPEED TRANSMISSIONS, By Howard W. Olnowich, now U.S. Pat. No. 6,047,113.

BACKGROUND OF THE INVENTION

1. Technical Field of the Invention

This invention pertains to digital parallel processing systems wherein a plurality of nodes communicated via messages sent over an interconnection network. More particularly, the invention relates to a network adapter design for facilitating introduction of faster speed transmission products into a network including slower products.

2. Background Art

In a parallel system, wherein a plurality of nodes are interconnected by a multi-stage network, each node usually interfaces to the network via a network adapter. The network adapter normally implements message buffers, usually a send First In First Out (FIFO) containing a plurality of messages to be sent to the network, and a receive (RCV) FIFO buffer containing a plurality of messages which have been received from the network.

As network systems mature, a series of network adapters are produced with ever increasing performance. A problem with the introduction of adapters with increased performance is lack of compatibility with the older, slower speed adapters. There is a need in the art for an adapter design which enables the mixture of new, higher speed adapters, and old, slower speed adapters, in the same network system. Customers would prefer to mix adapters without having to loose the investment already made in the older adapters.

Similar problems have existed for years for adapter cards that plug into processor input/output (I/O) busses. The state-of-the-art solution is to introduce new signals in the I/O bus for controlling the speed of a transmission. The sending adapter looks for status on these new bus signals to determine how fast the receiving adapter can receive a transmission. After the receiving device senses its address on the bus, it drives the new bus signals to a state that defines to the sender the speed of the receiving adapter. This works very well for short busses, because the two parties of the transfer can decide quickly on an acceptable transmission speed to be used. The bus itself adapts readily to different frequencies since it is merely a group of parallel copper wires that can accept transmissions over a wide range of frequencies.

The same problem over multi-stage networks becomes more difficult to solve. Handshaking between adapters to establish a transmission speed over new speed control lines added to the network is not a viable solution for many reasons: (1) Distances between nodes can be great and the resulting latency of handshaking is usually an unacceptable practice that is not supported in most networks. (2) Most networks are unidirectional, going from sender to receiver, and contain two separate sets of communication lines, one going in each direction, that are totally independent of each other. This normal network concept does not support new speed control lines travelling in the reverse direction from receiver to sender. (3) Many networks comprise switches that are clocked at a given speed and have the capability to transmit at multi-speeds.

Consequently there is a need in the art for a transmission system design capable of dynamically adjusting the transmission speed of the sending network adapter and of the receiving network adapter to different transmission speeds with low latency, so that adapters with different maximum speed capabilities can communicate with each other over the same network. Thus, by way of example, there is a need to mix adapters having transmission speeds of, say, 8 Megahertz (MHZ), 25 MHZ and 50 MHZ so (1) a 8 MHZ adapter could communicate with 8 MHZ adapters, 25 MHZ adapters and 50 MHZ adapters, but the communication to and from all three adapter types is limited to 8 MHZ; (2) a 25 MHZ adapter could communicate with 8 MHZ adapters, 25 MHZ adapters and 50 MHZ adapters, with communication to/from the 8 MHZ adapter being limited to 8 MHZ, while communication to/from the other two adapter types is limited to 25 MHZ; and (3) a 50 MHZ adapter could communicated at all three speeds.

It is, therefore, an object of the invention to provide an improved network system having the capability of mixing high speed adapters and low speed adapters.

It is another object of the invention to provide an improved network adapter design capable of adapting its transmission speed to that of another adapter of the same or slower speed so as to mix adapters of different speeds in the same communication network.

SUMMARY OF THE INVENTION

This invention provides an apparatus and method for selectively sending and receiving data messages with respect to a communication network, and includes a sending adapter for sending send messages to the communication network, the send message including indicia defining the transmission speed; and a receiving adapter for receiving receive messages from the communication network, the receive message including indicia defining the transmission speed.

Other features and advantages of this invention will become apparent from the following detailed description of the presently preferred embodiments of the invention, taken in conjunction with the accompanying drawings. dr

DESCRIPTION OF THE DRAWINGS

FIG. 5 is a bit-by-bit definition of the 32-bit table look-up word that controls the message speed selection.

FIG. 7 is a timing diagram for a byte-wide message transfer transmitted over the multi-speed network according to the preferred embodiments of the invention.

FIG. 9 is a timing diagram for byte-wide message transfer.

BEST MODE FOR CARRYING OUT THE INVENTION

Figure 1:
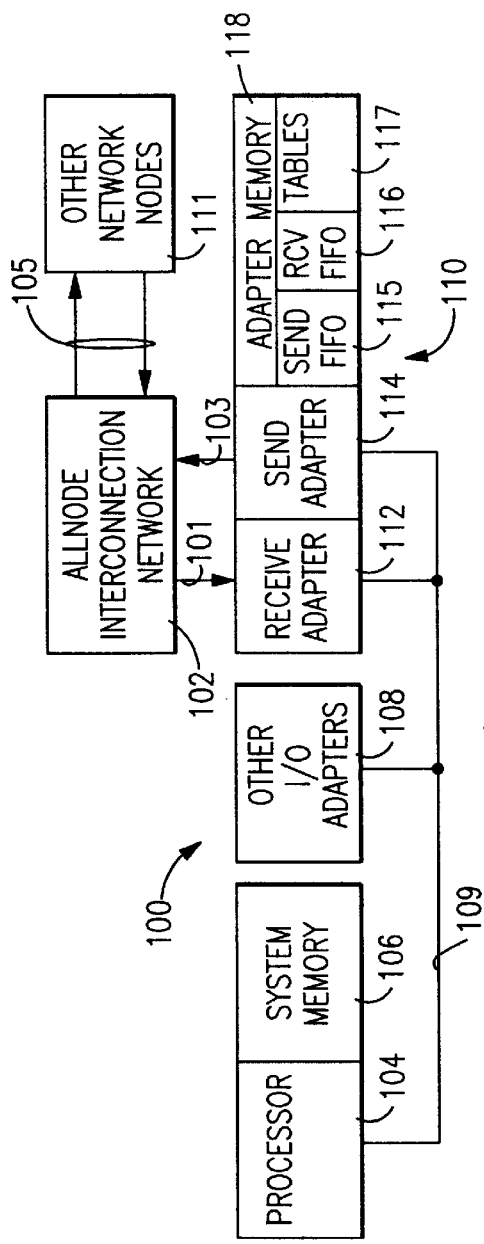
FIG. 1 is a block diagram of a digital network in accordance with preferred embodiments of the invention, showing the interconnection of a network node to the network and the components of the network node.

Referring to FIG. 1, a typical digital network showing the interconnection of a network node to the network and the components of the network node according to the preferred embodiments of the this invention.

Node 100 includes processor 104, system memory 106, and various I/O adapters 108, 110 interconnected by way of system bus 109, and attaches to one port 101,103 of network 102. Network adapter 110 which processor I/O bus 109 for communication to network 102. Network adapter 110 includes sending adapter 114 which transmits messages from network adapter 110 over port 103 to other network node 111 adapters attached to network 102 at ports 105; receiving adapter 112 which receives messages from the other network node 111 adapters attached by way of ports 105, 101,102 into network adapter 110; and adapter memory 118, including an area of memory dedicated as a send FIFO 115, an area of memory dedicated as a receive FIFO 116, and an area of memory dedicated as a look-up table 117.

In operation, processor 104 sends commands in the form of a 32-bit address word followed by 32-bit data words over I/O bus 109 to control network adapter 110. One of processor 104 commands writes messages directly to send FIFO 115, while another reads messages directly from receive FIFO 116, and yet another writes words to look-up table 117. The address word defines the operation to take place: write to send FIFO 115, read from receive FIFO 116, or write to look-up table 117. Messages for transmission to other nodes are sent from processor 104 over I/O bus 109 to send FIFO 115. After the message is in send FIFO 115, sending adapter 114 controls the reading of the message from send FIFO 115 and transmits it over network 102 at the selected speed. The two preferred embodiments described hereafter in greater detail illustrate the operation of sending adapter 114 for selecting one of four different speeds for the transmission of each message to network 102 over port 103. The speed selection is made individually for each message transmitted.

Network adapter 110 is bidirectional with network 102, and contains one interface 103 for sending messages to network 102 and one interface 101 for receiving messages from network 102. All messages sent to network 102 are routed over processor I/O bus 109 to network adapter 110, where they are stored into send FIFO 115. Sending adapter 114 then reads the message from send FIFO 115 and sends it to network 102; thus, network adapter 110 is a store-and-forward adapter. Network adapter 110 also supports the reverse operation, where messages arriving into network adapter 110 from network 102 are recovered and routed by receiving adapter 112 to receive FIFO 116. The message is temporarily stored in receive FIFO 116 until a slave operation is initiated at network adapter 110 to read the message over processor I/O bus 109 to processor 104. For multi-speed operations both sending adapter 112 and receiving adapter 114 require special logic to be described hereafter.

The preferred embodiment of network 102 is a multi-stage interconnection network including Allnode switches at each stage of the network. As described in U.S. Pat. No. 5,404,461, the Allnode switch provides a network 102 that supports multiple speed transmissions inherently, so the design of network 102 need not be changed from that described in order to support the multiple speed transmission provided by this invention. Thus, this preferred embodiment of the invention is implemented within receiving adapter 112 and sending adapter 114, and uses the multi-speed network capability already available in the art for network 102. Allnode switches which make up network 102 in accordance with the preferred embodiments have no central clock for controlling the network speed. Instead, network 102 automatically conforms to the speed at which an individual adapter 110 transmits. Other circuit switched networks that are unclocked would provide alternate networks 102 for use in connection with this invention.

Figure 2A:
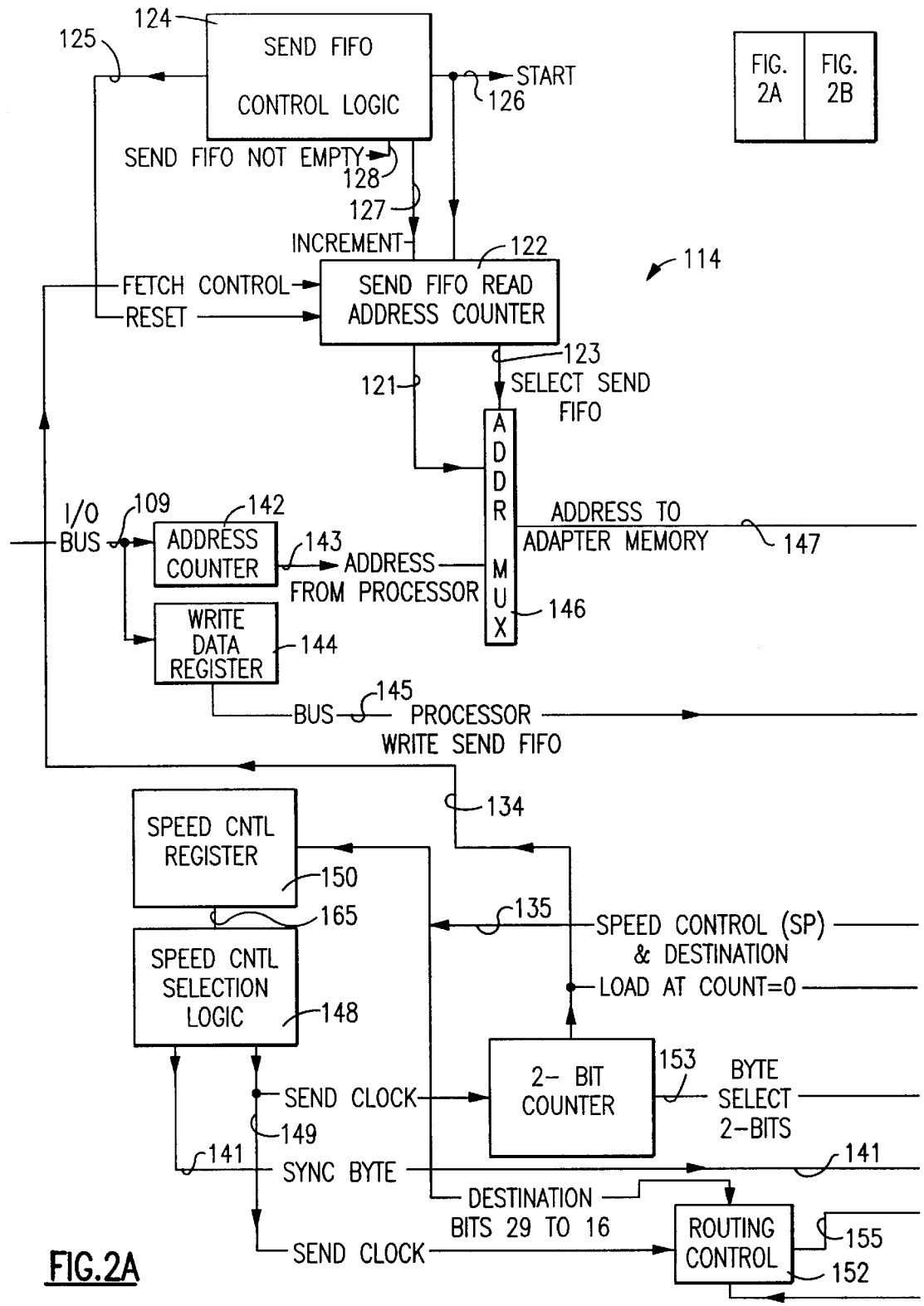
FIG. 2 is a block diagram of a sending adapter for transmitting any of four different speed messages in accordance with a first embodiment of the invention.
Figure 2B:
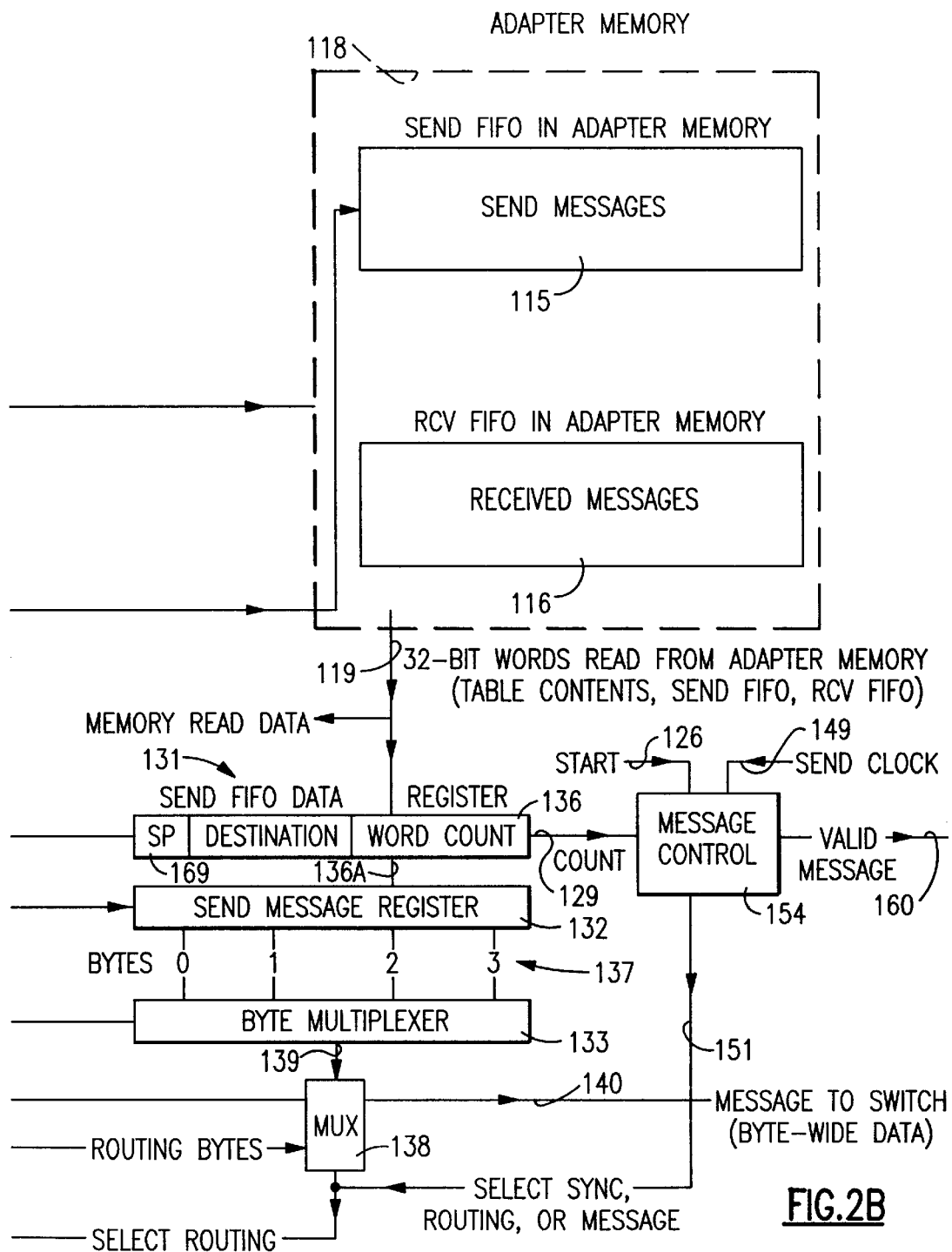

Referring to FIG. 2, a block diagram is presented of a first preferred embodiment of the sending adapter 114 for sending any of four different speed messages over the multi-speed network as controlled by two bits in the message header word.

I/O bus 109 feeds address counter 142 and write data register 144. The output of address counter 142 is fed on line 143 to address multiplexer 146, the output of which is fed on line 147 to address adapter memory 118. The output of write data register 144 is fed on line 145 to send FIFO 115. Adapter memory 118 also includes receive FIFO 116.

Other inputs to address multiplexer 146 come from send FIFO read address counter 122, including lines 121 and select send FIFO line 123. Send FIFO control logic is responsive to send FIFO not empty line 128, and its outputs include start 126 (which is also fed to message control 154), increment 127, and reset 125.

Memory read data 119 output from adapter memory 118 is fed to send FIFO data register 131, which includes speed control field 169, destination field 166, and word count field 136. The output of send FIFO data register 131 is fed on count line 129 to message control 154, on line 136A to send message register 132, and on speed control and destination line 135 to speed control register 150 and routing control block 152. The output of send message register 132 is fed on lines 137, bytes 0, 1, 2 and 3, to byte multiplexer 133, and is loaded in response to count=0 on line 134 from 2-bit counter 130. 2-bit counter 130 output 134 is also fed to send FIFO read address counter 122, and on line 153 to byte multiplexer 133. The output of speed control register 150 is fed on line 165 to speed control selection logic 148, the output of which includes SYNC byte 141 to multiplexer 138 and send clock 149 to routing control 152 and message control 154. The output of routing control 152 is fed as routing bytes 155 to multiplexer 138 along with line 139 from byte multiplexer 133. The outputs of multiplexer 138 include byte-wide data to switch on line 140, and select routing on select SYNC, routing, or message line 151, which also originates at message control 154. The other output of message control 154 is valid message signal 160.

Figure 6A:
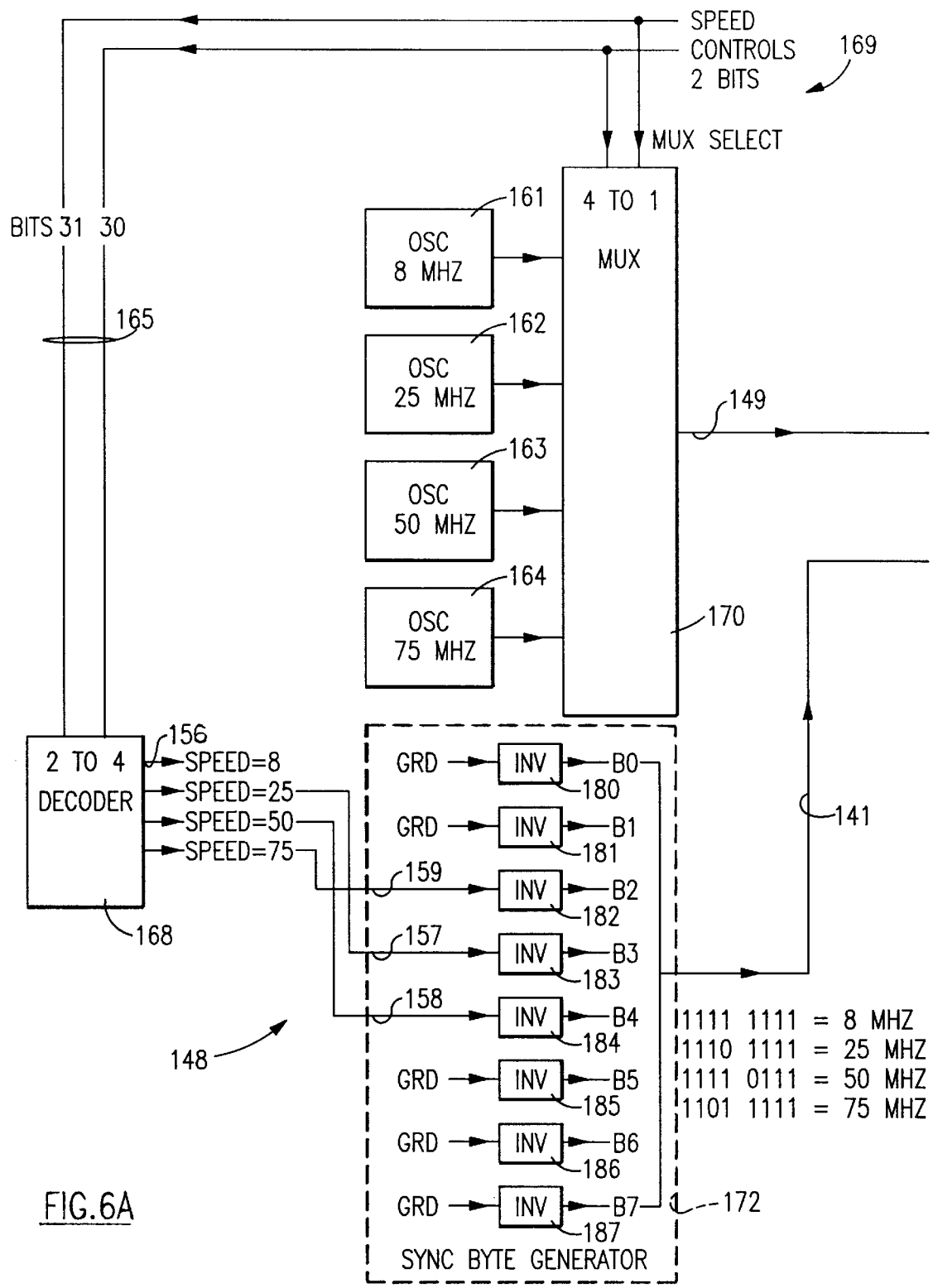
FIG. 6 is a block diagram showing further details of the speed control apparatus at the sending adapter according to the preferred embodiments of the invention.

Referring further to FIG. 2, to provide compatibility to previous network adapters 111, each new adapter 110 must implement multiple sending and receiving speeds. Thus, the newest adapter must support all of the previous sending speeds plus add the new speed that it supports. In the preferred embodiments it is assumed for discussion that new sending adapter 114 implements three previous speeds of 8 megabytes per second (MBS), 25 MBS and 50 MBS, and also a new speed of 75 MBS equal to byte wide data being transmitted by a 75 MHZ send clock 149, 164 (FIGS. 2, 6 and 7.)

For the first embodiment (FIG. 2), the multiple sending speed selections are made in the hardware based on bits 31 and 30, field 169 of the message header loaded in send FIFO data register 131. For this example, field 169 define the transmission as follows: 00=8 MBS, 01=25 MBS, 10=50 MBS, and 11=75 MBS. If three encoded bits were used in field 169 of message header 131, up to eight different transmission speeds could be defined, and similarly more for more bits in field 169.

Referring further to FIG. 2, to execute a send operation, processor 4 sends messages over I/O bus 109 which includes address and data. The address is stored to counter 142, and data to register 144. The address loaded to counter 142 defines where the message is to be written in adapter memory 118; in this case it defines the next available location in send FIFO 115. Address counter 142 is used to provide an address to adapter memory 118 through multiplexer 146. Register 144 is used to provide data to adapter memory 118 over bus 145. After register 144 is written to send FIFO 115, address counter 142 is incremented and processor 104 sends the next data word over I/O bus 109 into register 144. Again the data is written to send FIFO 115, this time to the next address. This operation of writing one word at a time to send FIFO 115 continues until the entire message is stored. Thereupon, send FIFO NOT EMPTY 128 becomes true, indicating that send FIFO 115 has a message and is not empty). Send FIFO control logic 124 senses line 128 going true, and issues start 126 to initiate the sending of message from send FIFO 115 to network 102 on line 140 at the commanded speed 149.

Start signal 126 causes send FIFO read address counter 122 to access send FIFO 115 based on the address stored in counter 122, which is reset by line 125 after each message to point to the address containing the first word of the next message in send FIFO 115. The first word of the message is accessed and counter 122 is incremented. The first accessed word is message header word which is loaded into send FIFO data register 131. Start signal 126 also sets valid message 160 from message control 154, which is sent to network 102 to indicate that the transmission of a message is starting.

Bits 31 and 30 (field 169) of the message header in register 131 are sent to speed control register 150, where they are latched for the duration of the present message, and then to speed control selection logic 148, which performs the function of selecting the transmission speed for each individual message. The word count field 136 from the message header is sent on line 129 to message control block 154, so it can keep count of the number of words being transmitted to network 102 and terminate the valid message signal 160 and message transmittal on line 140 at the correct time. Destination field 166 from the message header in register 131 is sent to routing control block 152 over line 135, which immediately decodes the destination field to form the routing bytes through network 102. The routing bytes are sent to network 102 first from block 152 through multiplexer 138. Message control 154 controls multiplexer 138 to select the source of the data bytes to switch network 102 at the appropriate times: first the routing bytes, then the SYNC byte, and finally the message bytes. When there is no active multiplexer selection from block 154, multiplexer 138 sends all zeroes to network 102. Speed control logic 148, 150 will be further described hereafter in connection with FIG. 6.

Figure 3A:
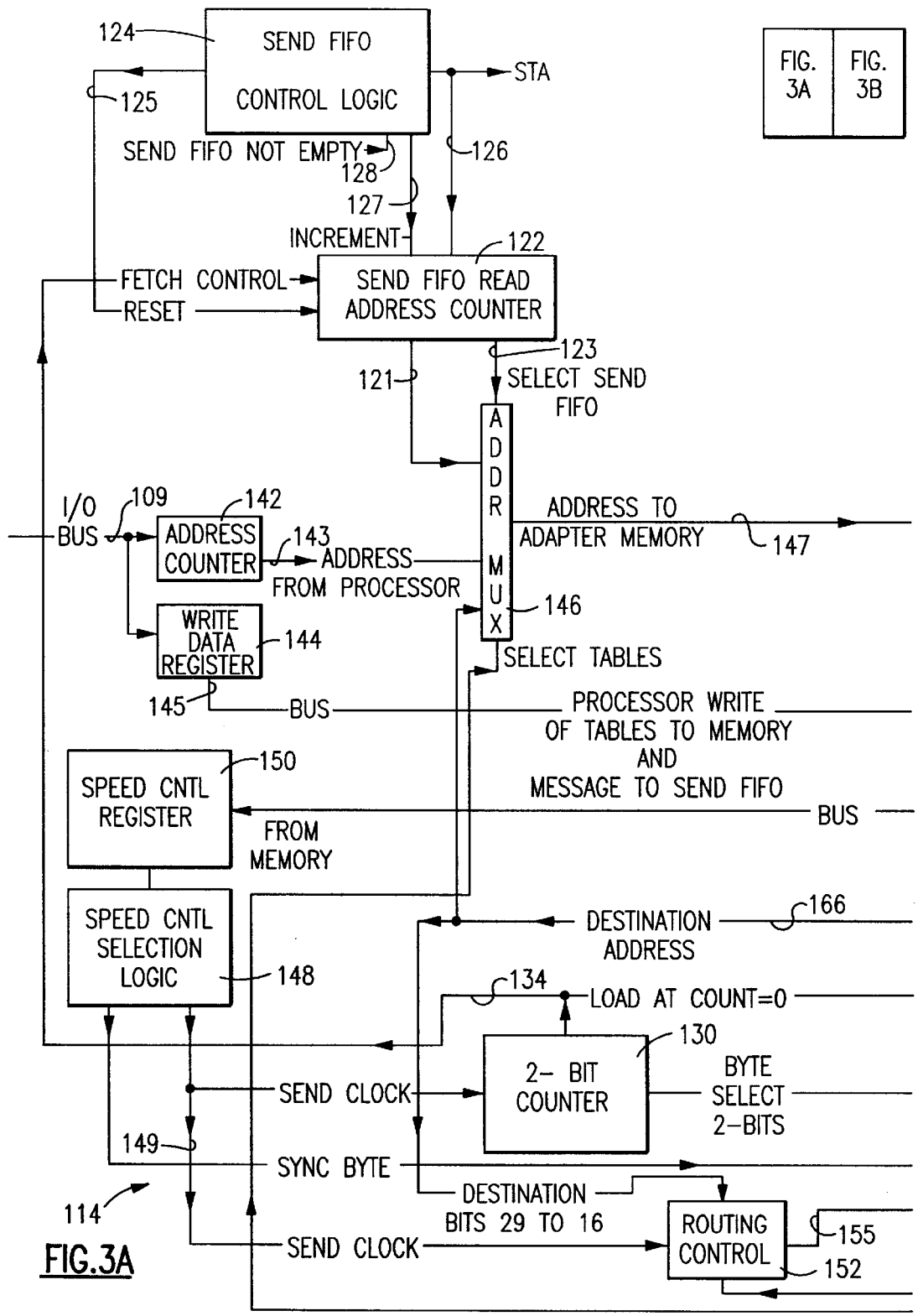
FIG. 3 is a block diagram of a sending adapter for transmitting any of four different speed messages in accordance with a second embodiment of the invention.
Figure 3B:
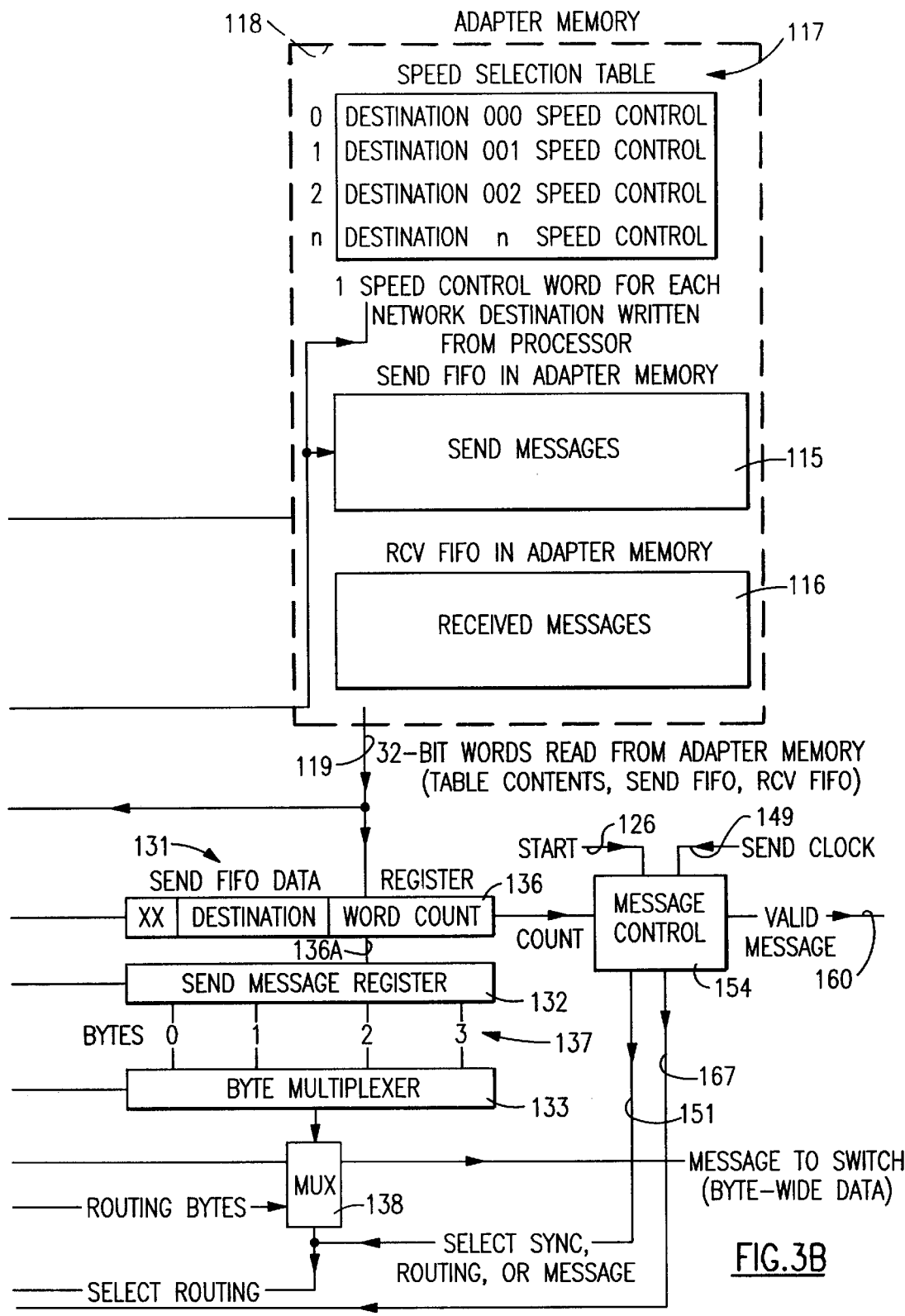

Referring to FIG. 3, a block diagram is presented of a second preferred embodiment of the sending adapter for sending any of four different speed messages over the multi-speed network. This second embodiment differs only slightly from the first embodiment described in connection with FIG. 2, the differences being that in FIG. 3 adapter memory 118 includes speed selection table 117, message control 154 includes select tables output line 167 which is fed to address multiplexer 146 along with destination address line 166 from send FIFO data register 131.

In operation, speed selection control bits, which are part of the message header for the first preferred embodiment, are prestored into speed selection table 117 instead. This differs from the first embodiment in that processor 104, instead of storing the table in system memory 106, constructs the table in the same way but stores it to adapter memory 118 speed selection table 117. This way processor 104 is relieved of doing the table lookup, and sending adapter 114 does the job. Table 117 is formed in lower adapter memory 118 and is addressable by the destination field 166 of the message header word: that is, the destination node number is the address in table 117 where the speed selection controls are stored. Processor 104 loads table 117 during initialization over I/O bus 109. The address from I/O bus 109 is stored to counter 142 and to data register 144. Address 142 defines where the message is to be written in adapter memory 118; in this case, it is the node number of the speed being defined by the data loaded into register 144. Address counter 142 is used to provide an address to adapter memory 118 through multiplexer 146. Register 144 is used to provide data to adapter memory 118 over bus 145. Register 144 is written to table 117 one word at a time. This continues as address counter 142 is incremented and processor 104 sends the next data word over I/O bus 109 into register 144. When table 117 is completely loaded, processor 104 can begin sending messages.

For the second embodiment, as illustrated in FIG. 3, block 124 starts the send operation as usual, when there is a message in send FIFO 115 to be transmitted to network 102. The message header word is accessed and temporarily stored in register 131. Destination field 166 from register 131 is used in multiplexer 146 to address adapter memory 117 and fetches the speed selection control word from the table for the active destination (one of destination nodes 111.) The word read from table 117 is sent via bus 119 to register 150, where the speed control bits are stored for the duration of this message. The operation continues from this point on in a manner identical to the first embodiment. Thus, the major difference is in the loading of register 150: in the first case it is loaded directly from the message header word (line 135, FIG. 2), and in the second case it is loaded from look-up table 117 in adapter memory 118 (line 119, FIG. 3.)

Figure 4:
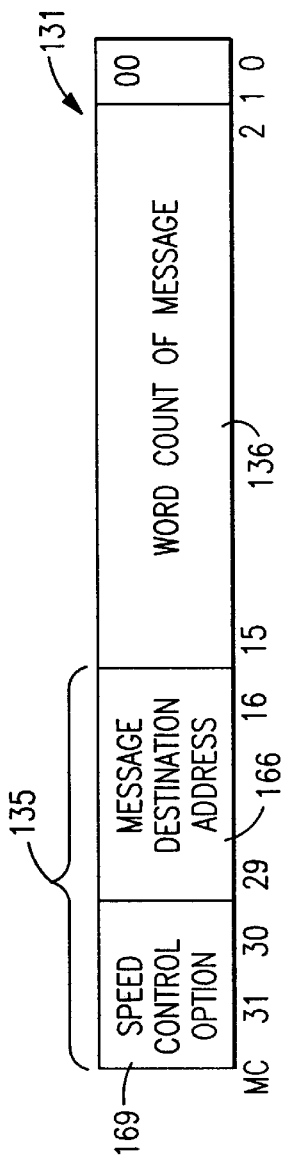
FIG. 4 is a bit-by-bit definition of the 32-bit message header word that prefixes every message transmitted over the multi-speed network of FIG. 1.

Referring to FIG. 4, a 32-bit message header word prefixes every message transmitted over the multi-speed network of the preferred embodiments of the invention. Speed control option field 169, bits 31 and 30 of message header 131 select the speed at which the message is to be transferred over network 102 by selecting the frequency of send clock 149, which controls the speed of the data bytes being sent to network 102 on line 140 (the data lines at port 103). The first of two preferred embodiments of the invention uses bits 30 and 31 to define the variable message transfer rate by the sending adapter 114 for each message individually. Processor 104 in this case has a look-up table in system memory 106 where it records the maximum speed acceptable by each destination node over network 102. This table is established during initialization by each node sending a message to all other nodes at the lowest network speed (which is always supported by all nodes 100, 111) informing them of the maximum speed that it can receive. Each node processor 104 uses these initial messages to form a speed by destination table in its system memory. 106. When processor 104 wishes to send a message to a particular destination node 111, it looks up the speed for that node in the table in system memory 106, and constructs the message header bits 31 and 30, field 169, to reflect the information it read from the table.

Referring further to FIG. 4, field 166, bits 29 to 16, of message header 131 specify the destination node 111, and field 136, bits 15 to 2, and bits 1 and 0 specify the length of the message, not including the header. Word count field 136 in message header 131 applies only to the D0 to Dn bytes (line 140, FIG. 7), and is expressed as N/4 words. Fields 169 and 166, together, form signal 135 (FIG. 2).

Referring to FIG. 5, 32-bit table look-up word 131 controls the speed selection of messages transmitted over the multi-speed network based on the network destination selected according to the second preferred embodiment of the invention described in connection with FIG. 3. These words 131 use only two bits, bits 31 and 30, field 169, which function identically to the way bits 31 and 30 function in the message header word for the first embodiment.

Referring to FIG. 6, a block diagram is presented showing further details of the speed control apparatus at the sending adapter for transmitting any of four different speed messages over the multi-speed network according to the preferred embodiments of this invention. In FIG. 6, speed control selection logic 148 includes multiplexer 170, decoder 168 and sync byte generator 172, and is driven by oscillators 161–164 and controlled by latched speed control bits on lines 165. The two speed control bits 169 latched in speed control register 150 (FIG. 2) are fed to 4 to 1 multiplexer 170 and 2 to 4 decoder 168. Oscillators 161–164, herein set for 8 MHZ, 25 MHZ, 50 MGZ and 75 MHZ, respectively, feed 4 to 1 multiplexer 170. Sync byte generator 172 includes a plurality of inverters 180–187, with inverters 180–181 and 185–186 tied to ground, and the outputs 157–159 of decoder 168, representing herein speeds of 25, 50 and 75 MBS, respectively, being fed to inverters 183, 184 and 182, respectively. Output 156, representing slowest speed 8 MBS, is also generated in decoder 168. The outputs of inverters 180–187 are collected into the SYNC byte fed on line 141 to multiplexer 138, with 1111 1111 representing 8 MHZ, 1110 1111 representing 25 MHZ, 1111 0111 representing 50 MHZ, and 1101 1111 representing 75 MHZ. The output of multiplexer 170 is fed on line 149 as the send clock signal.

In operation, control bits 169 are latched in register 150 and used to control multiplexer 170. Block 170 selects one of four mutually exclusive frequencies to gate to its output 149, which becomes the send clock signal of FIG. 2 and defines the frequency of the data sent to network 102. The way that send clock 149 determines the data transmission frequency is through block 130, which is a two bit cyclic counter that determines which byte is being sent at any given time. Two bit cyclic counter 130 increments on the rise of each send clock 149, so it counts at the rate defined by multiplexer 170. The output counter 130 feeds and controls byte multiplexer 133, which selects one byte at a time, which is four bytes per message word. The selected byte is output to network 102 on line 140 through multiplexer 138. The sequence is, referring back to FIG. 2, that words are accessed from send FIFO 115, starting with the header word, into register 131. While the next word of the message is being fetched based on incremented address counter 122, the word in register 131 is moved to register 132. From register 132, the byte multiplexer 133 selects one byte at a time and sends it to network 102 on line 140. Counter 130 increments every clock time of the selected frequency and causes bytes to be continually read out in cyclic order on lines 137: byte 0, byte 1, byte 2, byte 3, byte 0, etc. Every time that byte 0 becomes active, simultaneously the next word is loaded into register 132 from register 131, so that a fresh word is present in register 132 every time that byte 0 starts a new transmission cycle of the next four bytes. Likewise, the next access from memory must store the next word of the message into register 131 during the four clock times that register 132 is being serialized into byte-wide data.

Before the message header and data starts being transmitted to network 102 as described above, two other previous transmittals must occur—the routing and SYNC bytes as shown in FIG. 7. Message control logic 154 (FIG. 2) delays message transmittal and controls the insertion of the routing and SYNC bytes first. Routing control block 152 as controlled by block 154 decodes the destination field 166 from the message header in register 131, and in synchronization with block 154 selecting the routing control on line 151 into multiplexer 138, the routing bytes are provided sequentially into the byte-wide data inputs 139 to multiplexer 138. These are then passed through multiplexer 138 and output to network 102 on line 140. Next, SYNC byte 141 is sent through multiplexer 138 and is immediately followed by the message, now coming through multiplexer 133.

In interconnection network 102, each Allnode switch stage strips off one of routing bytes 166. By the time the message gets through the last stage of network 102 and arrives at the designated receiving adapter at one of nodes 111, all routing bytes have been stripped from the message and the very first non-zero byte that the receiving adapter of node 111 sees in SYNC byte 141. The SYNC byte serves two purposes at receiving node 111: (1) it provides one clock time to permit the receiving adapter to get in synchronization with the incoming asynchronous data, and (2) it defines the speed of the incoming message. In accordance with this exemplary embodiment of the invention, the four allowable SYNC bytes and their meanings are: 1111 1111, message is transmitted at 8 MHZ; 1110 1111, message transmitted at 25 MHZ; 1111 0111, message transmitted at 50 MHZ, and 1101 1111, message transmitted at 75 MHZ. The SYNC byte is variable and it must indicate the speed at which sending adapter 114 is transmitting the message.

Referring further to FIG. 6, logic is provided for creating the variable SYNC byte pattern. Register 150 latches the two speed control bits 169 and feeds them to decoder 168, which decodes the bits into one of four discrete signals 156–159, each defining one of the four transmission speeds. These four discrete signals 156–159 are mutually exclusive. SYNC byte generator 172 comprises eight inverters 180–187, which are fed either by ground (GRD=logical 0) or one of speed signals 156–159 from decoder 168. Ground through an inverter yields a logical 1, so the inputs to generator 172 are grounded to logical 1's on bits 0, 1, 5, 6, and 7 of the SYNC byte 141, such that these five bits are always 1's, regardless of which transmission speed is selected. Inverter 182 is fed from speed=75 signal 159, and causes SYNC byte bit 2 to go to zero only when the 75 MHZ speed is selected. Inverter 183 is fed from speed=25 signal 157, and causes SYNC byte bit 3 to go to zero only when the 25 MHZ speed is selected. Inverter 184 is fed from speed=50 signal 158 and causes the SYNC byte bit 4 to go to zero only when the 50 MHZ speed is selected.

SYNC byte 141 leaving generator 172 goes to byte-wide data input to multiplexer 138 and is gated through to the network on line 140 for only one clock time as commanded by block 154. Then block 154 immediately starts the transfer of the message header and message data words.

Referring to FIG. 7, a timing diagram is shown for byte-wide message transfer transmitted over the multi-speed network of invention. Sending adapter 114 transmits bytes of data 140 synchronized to sending clock 149. When sending adapter 114 is not transmitting a message, it sends all zeroes data bytes (00 in hexadecimal "h" notation) and deactivates its valid message line 160 to zero. Sending clock 149 inside sending adapter 114 is always oscillating, and it is not sent to network 102. Neither does network 102 receive a clock from any other source, thus it is an unclocked network. Sending adapter 114 sends only the byte-wide data 140 and valid message signal 160 to network 102. Sending adapter 114 begins sending a message to network 102 by activating valid message signal 160 to "1", and still sending null "00h" data bytes. After several clock times 149 elapse, sending adapter 114 sends routing bytes "R0" to "RN" to select a connection path through network 102 to desired destination 111. One routing byte is required to select on of eight routing options at each stage of network 102. Therefore, a network having N stages requires N routing bytes. After the routing bytes, sending adapter 114 transmits several "00h" bytes and begins to transmit the message by sending one SYNC byte to start the message, followed by the message. One data byte is sent on line 140 every clock time 149. The message header H0 to H4 is sent on line 140 immediately after the SYNC byte and includes four bytes. Immediately after the header, message data bytes follow, D0 to Dn, where "n" indicates that the message can be of variable length. After Dn is transmitted to end the sending of valid data bytes, 00h bytes are sent and valid message signal 160 is deactivated.

Figure 8B:
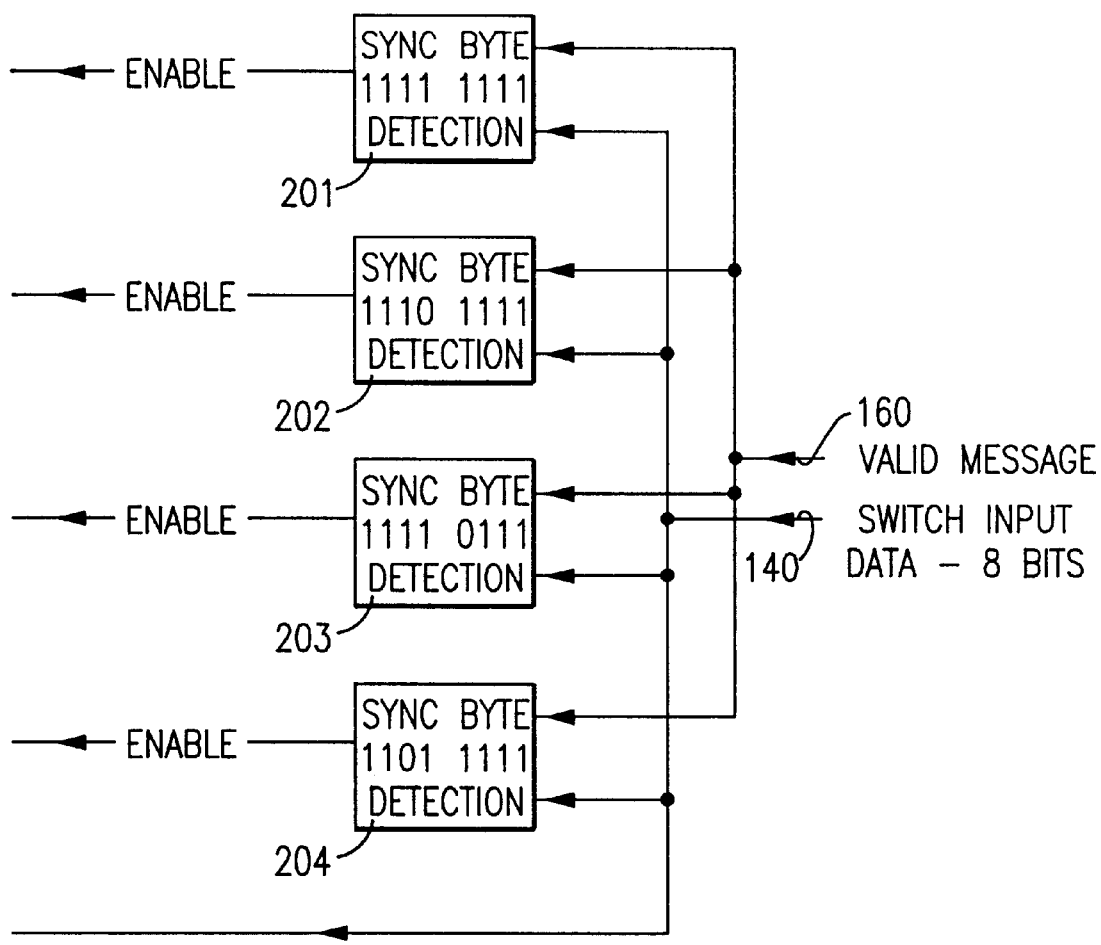
FIG. 8 is a block diagram of the receiving adapter for recovering asynchronously any of four different speed messages according to the preferred embodiments of the invention.

Referring to FIG. 8, receiving adapter 112 recovers asynchronously any of four different speed messages received over the multi-speed network according the both the first and second preferred embodiments of the invention as described in connection with FIGS. 2 and 3, respectively. Valid message line 160 is fed to SYNC byte detection logic blocks 201–204 along with switch input data line 140. Input data line 140 is also fed to input data register 222. The enable outputs of detection logic blocks 201–204 are fed to generate recovery clock 211–214, respectively, which in turn feed OR gate 220. The output of OR gate 220 is fed on line 226 to input data register 222 and message receive control block 224. The outputs of message receive control block 224 are store signal 230 and byte select signals 228 to input data register 222. The output of input data register 222 is move data line 232 to receive FIFO 116 in adapter memory 118.

In operation, to provide compatibility to previous network adapters, each new adapter 110 must implement multiple receiving speeds. The newest adapter must support all, or at least a common one, of the previous receiving speeds plus add the new speed that it uniquely supports. In the preferred embodiment it is assumed for illustration that new receiving adapter 112 implements three previous speeds (that is, speeds of 8 MBS 25 MBS and 50 MBS) plus a new speed of 75 MBS equal to byte wide data being transmitted and received by a 75 MHZ send clock 149 (FIG. 2)/164 (FIG. 6.) Receiving adapter 112 receives only a single byte wide interface bus 140 at port 101 from network 102. Interface port 101 includes eight data lines 140 plus valid message control line 160. Any of the four different messages speeds arrive over the same set of wires 101 (including lines 140 and 160). Routing bytes are stripped off, one byte at each stage of network 102, as the message travels from a sending adapter at one of nodes 111 to receiving adapter 112 at this node 100. Thus, the message that receiving adapter 112 receives is all zeroes until the SYNC byte arrives (see FIG. 9, described hereafter.)

Receiving adapter 112 detects the speed of the arriving message based on the bit pattern of the SYNC byte. In the two embodiments being described in connection with FIGS. 2 and 3, a SYNC byte of 1111 1111 means the message is transmitted at 8 MHZ; 1110 1111 at 25 MHZ; 1111 0111 at 50 MHZ; and 1101 1111 at 75 MHZ. The detection must be done in parallel and be done very quickly because the SYNC byte is only valid for 1 clock time of the transmitting frequency. Thus SYNC byte detection logic blocks 201–204 are used in parallel, with each looking for a different SYNC byte pattern. Thus, only one of the four logic blocks 201–204 will detect a pattern match for message, at that block 201–204 will enable the associated one of four recovery clock generation circuits 211–214. The detection of a SYNC pattern defines the speed at which the message is to be received. It also disables further detection by the three other inactive circuits (three of 201–204) 80 that will not activate during recovery of the entire message.

SYNC detection circuits 201–204 and their associated recovery clocks 211–214 have been previously described in connection with U.S. patent application Ser. No. 07/659, 199, filed Feb. 22, 1991 for "Asynchronous Low Latency Data Recovery Apparatus and Method", abandoned; continued in Ser. No. 08/089,056, filed Jul. 8, 1993, abandoned; and continued in Ser. No. 08/407,928, filed Mar. 21, 1995, and now U.S. Pat. No. 5,610,953 the teachings of which are incorporated herein by reference.

Referring to the timing diagram of FIG. 9 in connection with FIG. 8, the output of one of circuits 211–214 generates recovery clock 226. Recovery clock 226 is always all zeroes when valid message line 160 is inactive (logical "0".) After valid message signal 160 goes active (logical "0"), SYNC byte detection circuits 201–204 each look for a specific data pattern of the switch input data byte on line 140. One of circuits 201–204 activates on finding that pattern, enabling the associate recovery clock generator 211–214 to generate a recovery clock 226 at the frequency of the arriving message. The individual recovery clock 211–214 starts one clock time after the SYNC byte and samples each successive data byte on the rise of the recovery clock. Recovery clock 226 is selected by OR gate 220 from the four possible recovery clocks 211–214. Recovery clock 226 is delayed by clock generate circuits 211–214 such that the rise of recovery clock 226 is centered in relation to switch input data 140. Recovery clock 226 is used to clock switch input data into register 222, one byte every clock time. Register 222 recovers byte-serial data on line 140, forming 32-bit words, under control of message receive control block 224, which cycles the four select lines 228 continuously on a mutually exclusive basis to gate in switch input data bytes 0–3 on line 140 in cyclic sequence. As each 32-bit word is completed in register 222, it is sent on bus 232 to receive FIFO 116. The storing to FIFO 116 of the received message on line 140 from sending node 111 through network 102 at the selected speed continues until the number of words defined by the word count in the header word is satisfied. After that, the valid message signal on line 160 returns to zero, and the four circuit pairs 201/211, 202/212, 203/213, 204/214 are all reset, stop the generation of recovery clock 226, and wait for the next rise of valid message signal 160.

As a result of the described embodiment of receiving adapter 112, back-to-back messages having a plurality of transmission speeds are recovered and sent to receive FIFO 116. This recovery is done efficiently without requiring any additional delay, whatsoever, to adapt to the plurality of transmission speeds.

Advantages Over the Prior Art

The preferred embodiments of the adapter 110 of the invention provide for handling various transmission speeds through network 102 without introducing any delays, such as those required by the handshaking techniques of the prior art.

Alternative Embodiments

It will be appreciated that, although specific embodiments of the invention have been described herein for purposes of illustration, various modifications may be made without departing from the spirit and scope of the invention.

For example, as will be apparent to those skilled in the art, the adapter heretofore described may be implemented in a general purpose computer chip operable under control of a storage medium including data structures defining the method of operation of the invention.

Accordingly, the scope of protection of this invention is limited only by the following claims and their equivalents.

I claim:

1. An adapter for communicating with a multi-stage switching network by selectively sending and receiving data messages with respect to a remote node, wherein each of said data messages is transmitted at one of a plurality of speeds with respect to a single interface for sending messages to said switching network and a single interface for receiving messages from said switching network, the speed of the each of the said data messages being selected without delaying successive messages, said adapter comprising:

a sending adapter for sending send messages to said remote node over said switching network at a preselected one of a plurality of predetermined transmission speeds, said send messages including prefix indicia defining said preselected transmission speed; and a receiving adapter for receiving a plurality of receive messages from said remote node over said switching network at a plurality of speeds with respect to a single interface, wherein the speed of the receive message is detected by said receiving adapter attempting to receive said message at all said plurality of speeds simultaneously in parallel and determining at which of said plurality of speeds said prefix indicia is recognized.

2. The adapter of claim 1 wherein said sending adapter communicates messages from a nodal processor to said communication network, and further comprises:

circuitry for loading indicia defining the transmission speed to said send messages from data:

received from said nodal processor.

3. The adapter of claim 1 wherein said sending adapter further comprises:

a table for storing said defined transmission speed for at least one of a plurality of other receiving adapters; and circuitry for loading indicia defining said transmission speed to the header of messages addressed to said at least one of a plurality of other receiving adapters.

4. The adapter of claim 3 further comprising an adapter memory for storing said send messages, said receive messages, and said table.

5. The adapter of claim 1 further comprising an adapter memory for storing send messages and receive messages.

6. A method of communicating with a multi-stage switching network by selectively sending and receiving data messages, wherein each of said sending data messages is transmitted at one of a plurality of speeds with respect to a single interface for sending messages to said multi-stage switching network and wherein each of said receiving data messages is received at one of said plurality of speeds with respect to a single interface for receiving messages from a communication network, the speed of the each of said data messages being selected without delaying successive messages, according to steps comprising:

sending send messages to said switching network at a preselected one of a plurality of transmission speeds, said send messages including prefix indicia defining said preselected transmission speed; and receiving at a receive adapter a receive message from said switching network; and determining the speed of said receive message by attempting to operate said receive adapter to receive said receive message at all said plurality of transmission speeds simultaneously in parallel and determining at which of said plurality of transmission speeds said prefix indicia is recognized.

7. The method of claim 6 wherein messages are communicated from a nodal processor to said communication network, and further comprises the step of:

loading indicia defining the transmission speed to said send messages from data received from said nodal processor.

8. The method of claim 6, further comprising the steps of:

storing a table of indicia identifying transmission speeds capable of being received by at least one of a plurality of other receiving adapters; and loading indicia defining said preselected transmission speed to the header of messages addressed to said other receiving adapter.

9. The method of claim 8, further comprising the step of storing said table in adapter memory said SYNC signal followed by said send message.

10. The method of claim 6, further comprising the step of storing send messages from said nodal processor and receive messages in adapter memory.

11. Medium for storing a data structure for controlling the operation of a computer according to the steps of:

sending send messages to a multi-stage switching network, wherein each of said send messages includes indicia defining the transmission speed with respect to a single interface for each of said send messages, the speed of each of said send messages being selected from a plurality of transmission speeds without delaying successive send messages;

receiving receive messages from said multi-stage switching network; and determining the speed of said receive messages by attempting to receive said receive messages at all said plurality of transmission speeds simultaneously in parallel and determining at which of said plurality of transmission speeds said prefix indicia is recognized.

* * * * *